United States Patent [19]

Gwinn

[11] Patent Number: 5,667,202
[45] Date of Patent: Sep. 16, 1997

[54] HYBRID ELASTOMER-AND-METAL SPRING ISOLATOR

[75] Inventor: James T. Gwinn, Erie, Pa.

[73] Assignee: Lord Corporation

[21] Appl. No.: 618,148

[22] Filed: Mar. 19, 1996

[51] Int. Cl.$^6$ ............................................. F16F 3/10
[52] U.S. Cl. ........................ 267/33; 267/140.4; 267/152; 267/140.2
[58] Field of Search ................... 267/33, 81, 83, 267/84, 82, 3–4, 121, 140.2, 140.5, 202, 203, 207–213, 286–294, 141, 152, 153, 143, 145, 140.4; 280/692, 697, 715, 716; 180/300, 312, 902; 248/619, 638, 634, 583

[56] References Cited

U.S. PATENT DOCUMENTS

| | | | |
|---|---|---|---|
| 127,160 | 5/1872 | Eggleston | 267/33 |
| 1,734,596 | 11/1929 | Rosenzweig . | |
| 1,936,389 | 11/1933 | Hallquist | 267/140.4 |
| 1,951,020 | 3/1934 | Hoevel | 248/16 |
| 1,998,206 | 4/1935 | Rosenzweig | 248/16 |
| 2,044,649 | 6/1936 | Swennes et al. | 267/140.4 |
| 2,184,396 | 12/1939 | Mudge | 267/84 |
| 2,189,708 | 2/1940 | Coyne | 248/21 |
| 2,466,480 | 4/1949 | Rosenzweig | 248/21 |
| 2,484,191 | 10/1949 | Soldan | 248/22 |
| 2,520,442 | 8/1950 | Schwartz | 267/140.4 |
| 2,605,099 | 7/1952 | Brown | 267/140.4 |
| 2,660,423 | 11/1953 | Roy | 267/1 |
| 2,678,796 | 5/1954 | Roy | 248/358 |
| 2,680,284 | 6/1954 | Markowski et al. | 267/140.4 |
| 2,882,959 | 4/1959 | Burkart | 267/84 |
| 2,908,456 | 10/1959 | Gertel | 248/24 |
| 2,929,592 | 3/1960 | Spaetgens | 248/21 |
| 2,980,417 | 4/1961 | Pence | 267/33 |
| 3,052,435 | 9/1962 | Roller | 248/8 |
| 3,101,228 | 8/1963 | Olowinski | 267/140.4 |
| 3,130,964 | 4/1964 | Johnson | 248/621 |
| 3,144,228 | 8/1964 | Kass | 267/81 |
| 3,198,324 | 8/1965 | Kallenbach et al. | 206/46 |
| 3,323,764 | 6/1967 | Johnson | 248/21 |
| 3,428,279 | 2/1969 | Johnson | 248/21 |
| 3,625,466 | 12/1971 | Marshall et al. | 248/358 R |
| 3,633,228 | 1/1972 | Zysman | 267/152 |
| 3,730,462 | 5/1973 | Dick | 267/140.2 |
| 3,762,671 | 10/1973 | Schulz | 267/140.2 |
| 3,762,694 | 10/1973 | MacDonnell | 267/33 |
| 4,109,586 | 8/1978 | Briggs et al. | 267/211 |
| 4,111,406 | 9/1978 | Zanow | 267/153 |
| 4,738,436 | 4/1988 | Loggers | 267/150 |
| 4,766,708 | 8/1988 | Sing | 248/621 |
| 4,766,984 | 8/1988 | Gaffey et al. | 188/380 |
| 4,984,777 | 1/1991 | Kurr et al. | 267/140.1 |
| 5,160,122 | 11/1992 | Balsells | 267/167 |
| 5,222,264 | 6/1993 | Morry | 267/81 |
| 5,372,356 | 12/1994 | Luz et al. | 267/140.2 |

Primary Examiner—Douglas C. Butler
Attorney, Agent, or Firm—Richard K. Thomson; Randall S. Wayland; James W. Wright

[57] ABSTRACT

A hybrid elastomer-and-metal spring isolator with a low natural frequency. A fully bonded sandwich mount has cored pockets that receive metal coil springs. Extruded cavities on the lower and upper plates of the sandwich mount extend into the pockets within the interior of the coiled springs and receive a tension bolt and double lock-nut assembly to secure the separate lower cavities to the isolator. A preload retention nut engages a protruding portion of the tension bolt and preloads the coil springs to an amount equal to their static load. This hybrid isolator has particular application in mounting large (30 ton) diesel engines; the isolator assembly provides a natural frequency that is between 3 and 5 Hz, outside the normal idling frequencies of the engine so as to avoid resonance.

24 Claims, 5 Drawing Sheets

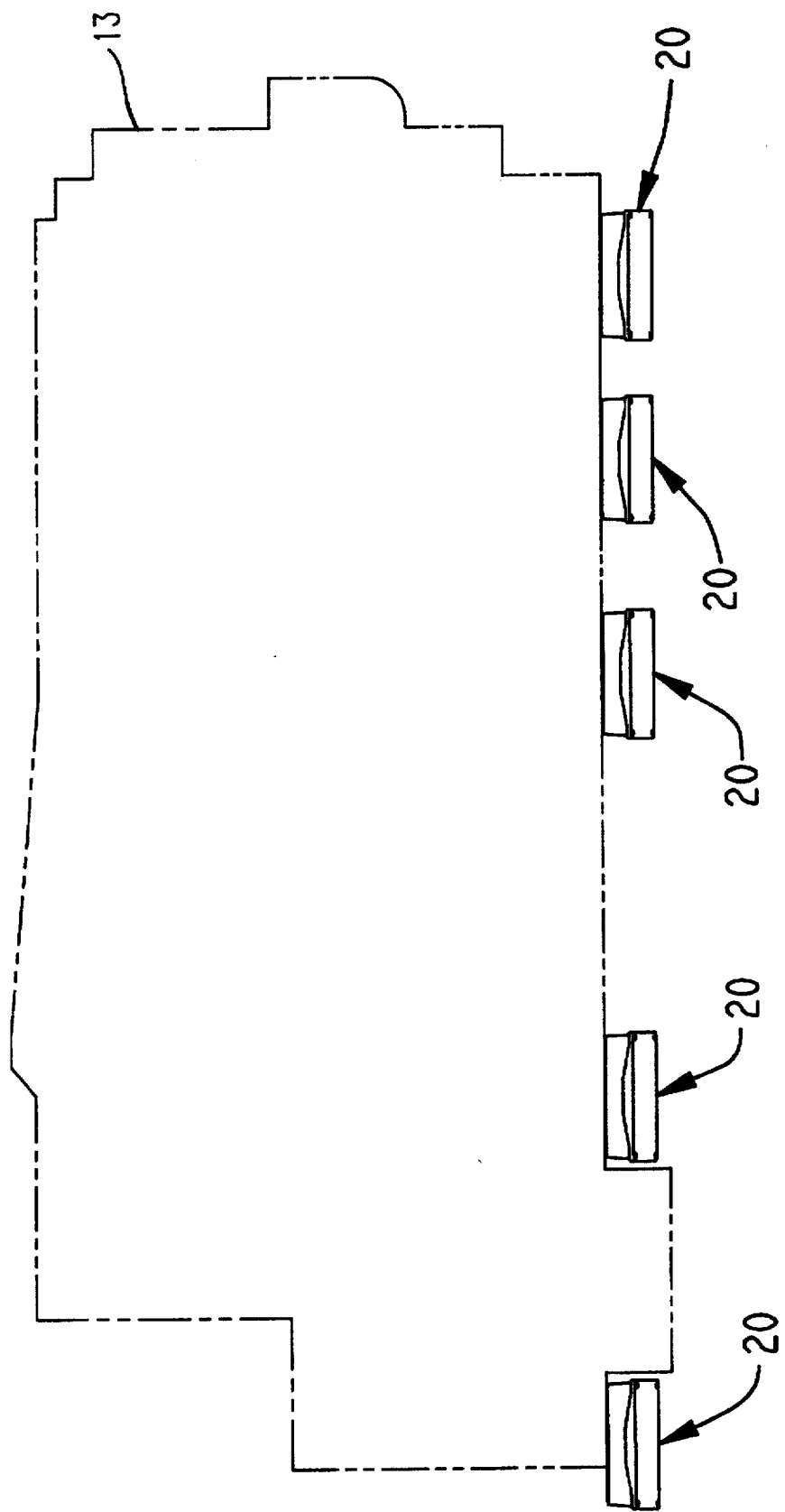

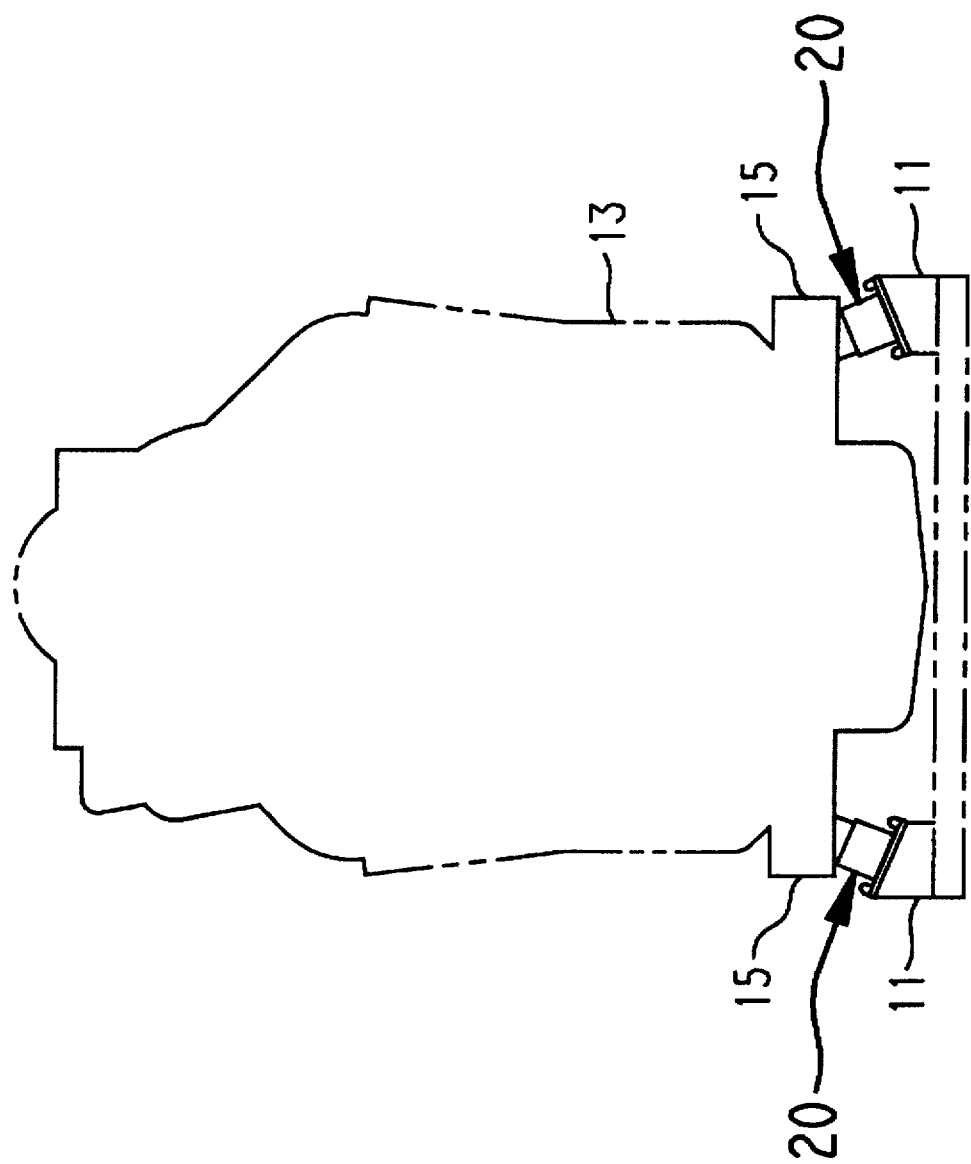

HYBRID ELASTOMER-AND-METAL SPRING ISOLATOR

BACKGROUND AND SUMMARY OF THE INVENTION

This invention is directed to a novel vibration isolator. More particularly, the present invention is directed to a hybrid elastomeric-and-metal spring vibration isolator with a low natural frequency at its rated load.

While this isolator may be considered for any of a number of general applications, it has particular advantages in mounting large diesel engines in such a way as to minimize/eliminate transmission of low frequency vibrations of the engine to its support structure. Specific applications of such diesel engines include, but are not limited to, locomotive engines and diesel engines on fishing boats.

It is the current practice in mounting large diesel engines, which, in some cases, with associated driven gear units, generators and auxiliary equipment, can weigh up to thirty tons, to produce a support deck that has positive camber (i.e., is bowed upwardly in the middle). This is to offset the vertical deflection that takes place when the engine assembly is positioned on them. This positive camber significantly complicates the preparation of support pads for the engine assembly. The platform must be deflected to its final curvature before the pads can be machined. Equipment and tools to facilitate such mounting pad preparation are heavy, complex and expensive. Further, the process using this equipment is time consuming and labor intensive, requiring as much as several days time to complete.

Some installations use elastomeric mounts for the engine assembly with natural frequencies of 7 Hz, or higher. Since large diesel engines have operational speeds in the 200-2000 rpm range, idle excitations will generally fall in the 6-10 Hz range. Since the natural frequency of the mounting system lies in the range of idle speed excitations for such engines, excitation of the suspension at its natural frequency (resonance) can occur when the diesel engine is at idle. Resonant operation does not merely result in full transmission of the engine's vibration to the support, as would result from hard mounting the engine directly thereto but, rather, can actually amplify the vibrational excitation up to ten times the response level of a hard mounted engine assembly. Obviously, such amplification can have undesirable effects and it is an important design consideration to try to move the natural frequency of the system outside the operating frequency of the engine or, if that is not possible, to a frequency (e.g., 3-5 Hz) through which the engine quickly passes during startup to prevent the build up of destructive harmonic vibrations.

Elastomeric isolators which could produce natural frequencies in the 3-5 Hz range have high static deflection and associated creep and drift that makes them unsuitable for some diesel engine applications where only minor (one inch or less) relative displacement can be tolerated due to connections to associated upstream and downstream hardware (e.g., air inlet ducts, exhaust ducts, fuel lines, auxiliary electrical power connections, compressed air lines). Further exacerbating the problem is the fact that the manner in which these conventional elastomeric blocks are mounted on the platform and attached to the engine assembly makes it difficult to focalize or semi-focalize the mount. Without some form of focalization in a low frequency suspension, the lateral translational and rotational modes of response will normally be coupled (due to the positioning of the mounts well below the center of gravity of the assembly) resulting in even greater undesired rocking motion of the engine.

The hybrid elastomer-and-metal spring vibration isolator of the present invention provides an isolation system with a low natural frequency (e.g., 3-5 Hz). This isolator comprises an elastomeric sandwich mount having a large elastomeric section bonded to first lower and second upper metal plates. The elastomeric section has a plurality of cored out pockets that receive helical metal springs. The upper and lower plates have cavities molded into them, the cavities extending into the cored out pockets through the center of the springs. The protruding end surface of the cavities are coated with a layer of elastomer which serves to provide cushioned snubbing in the compressive direction. The coil springs react against the nether (i.e., underneath) surfaces of the upper and lower plates, with a protective bearing seat being provided for the upper plate to protect the elastomer bonded thereto. The coil springs are designed with initial preload to fully support the static weight of the supported device so the elastomer experiences only dynamic loading. This significantly extends the service life of the isolator by reducing dynamic stress/strain levels on the elastomer.

A tension bolt with a length that exceeds the normal distance between the cavities of the upper and lower plates is equipped with a pair of load-transferring metal washers which engage elastomer-coated snubbing surfaces which, in turn, serve to provide cushioned snubbing of relative movement between upper and lower plates of the sandwich mount in the expansion direction. In addition, the interior coated surfaces reduce sound from metal-to-metal contact that would otherwise result between the tension bolt and the bare surfaces of the cavities. This tension bolt and its associated securement nut provide a first level of coil spring precompression restraint for the isolator, as well as limit the extension relative deflection, and hold the assembly together. A special retaining nut which engages a protruding end of the tension bolt preloads the metal springs to a second higher level of precompression which is substantially equal to the static load carried by the isolator. This retaining nut is designed to be removed prior to installation of the engine on the isolator platform.

Various other features, advantages and characteristics of the present invention will become apparent after a reading of the following specification.

BRIEF DESCRIPTION OF THE DRAWINGS

The preferred embodiments are described in detail in conjunction with the following figures, like reference numerals representing like elements.

FIG. 2 is a side view of the isolation system of the present invention supporting a diesel engine; and FIG. 3 is an end view of the isolation system with engine in place in accordance with FIG. 2.

DETAILED DESCRIPTION OF THE PREFERRED EMBODIMENTS

Figure 1A:
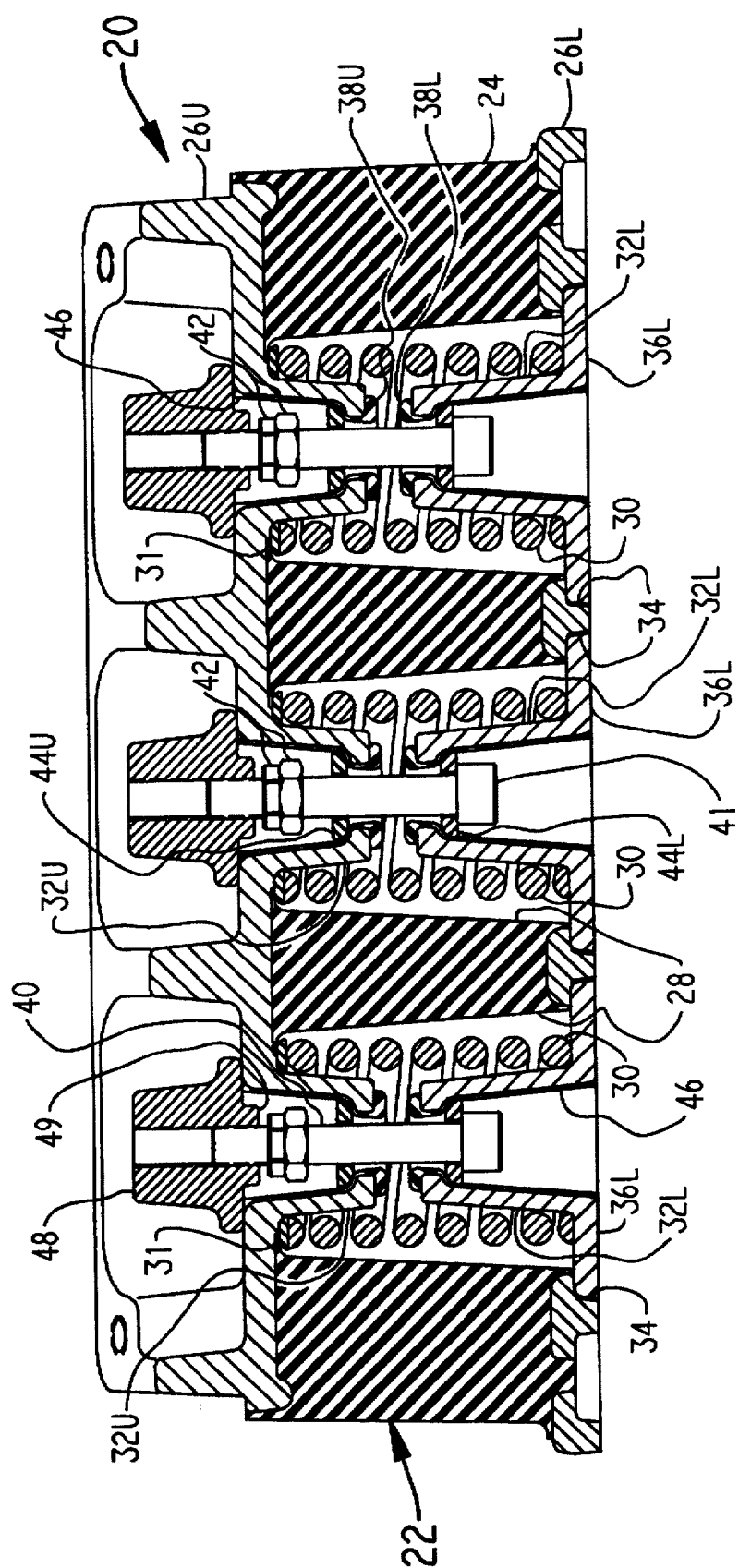
FIG. 1A is a cross-sectional side view of a hybrid elastomer-and-metal spring vibration isolator as seen along line A—A of FIG. 1C.
Figure 1B:
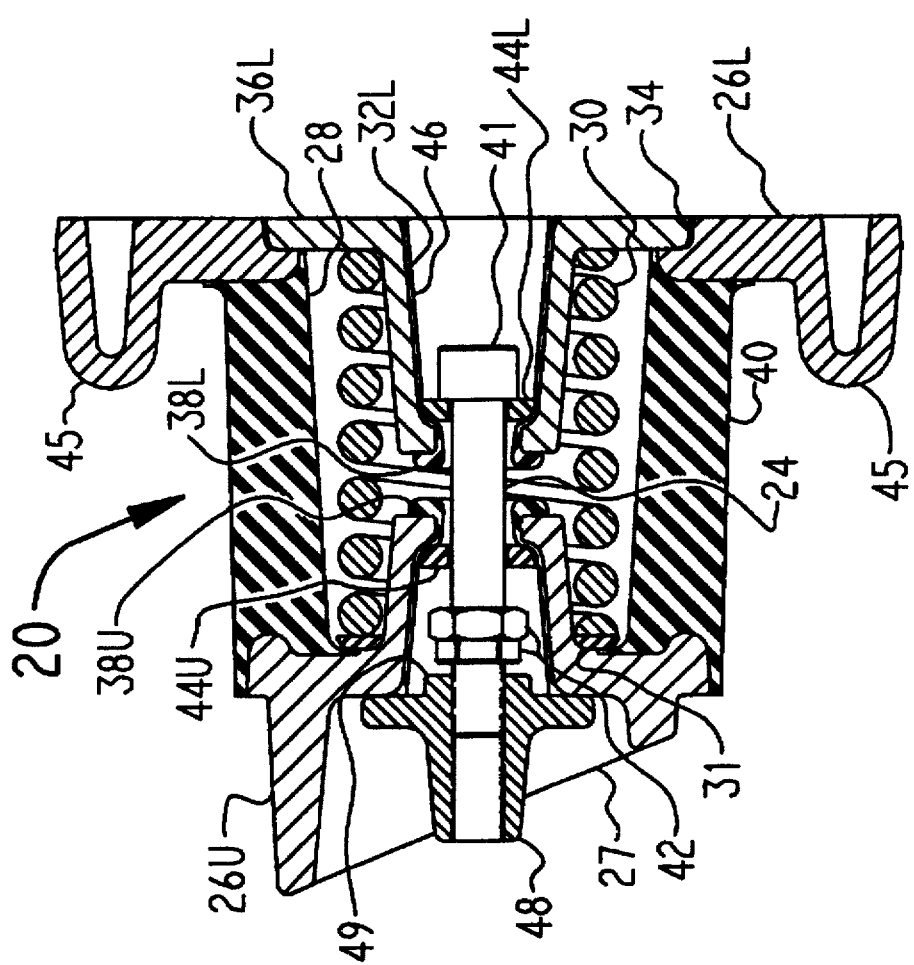
FIG. 1B is a cross-sectional end view of the isolator as seen along line B—B of FIG. 1C.
Figure 1C:
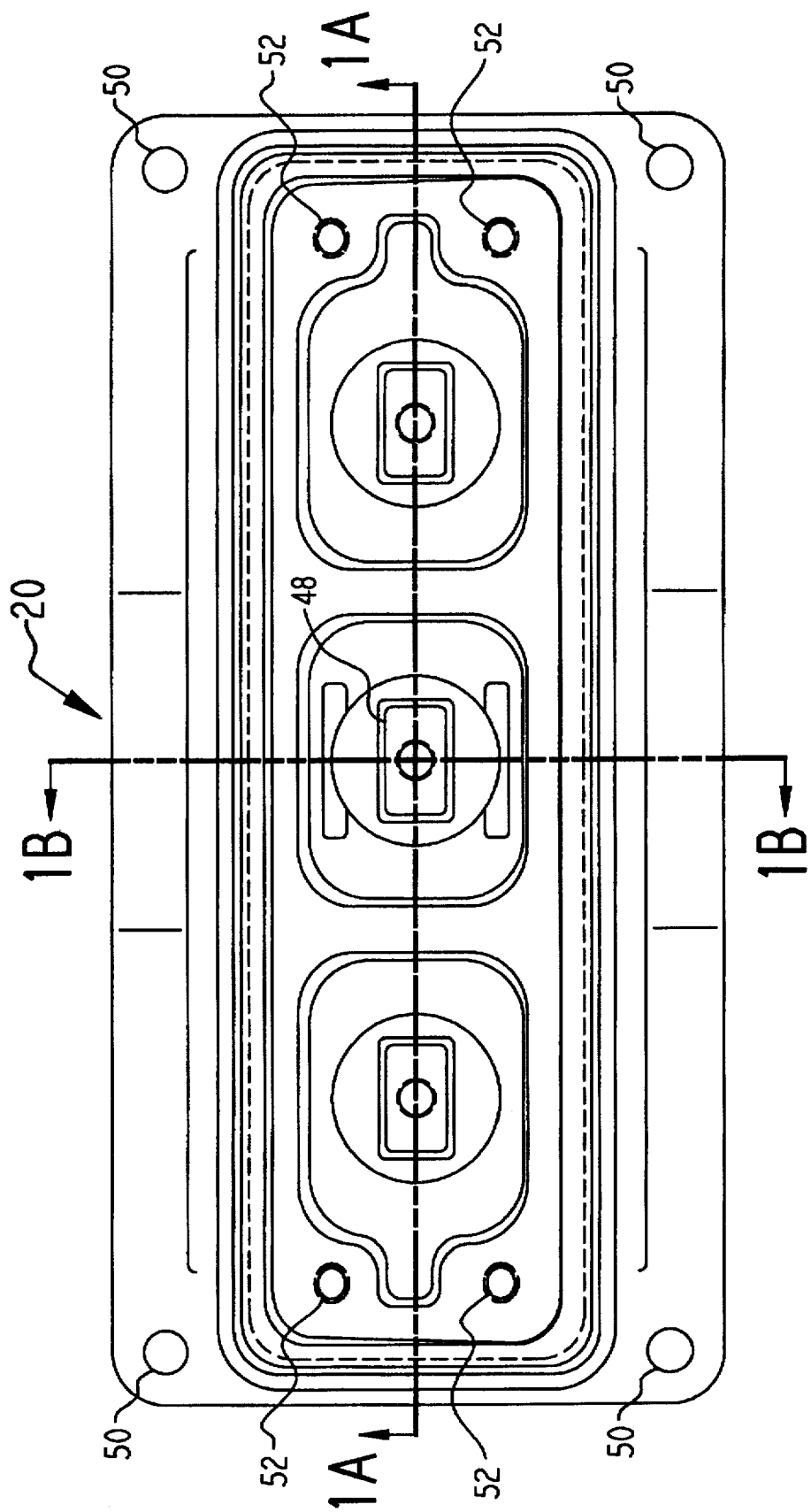
FIG. 1C is a top view of the isolator of FIG. 1A.

A first preferred embodiment of the hybrid elastomer-and-metal spring vibration isolator is shown in FIGS. 1A, 1B and 1C generally at 20. As best seen in FIG. 1A, isolator 20 comprises a sandwich mount 22 composed of a large elastomeric section 24 positioned between first lower metal plate 26L and second upper metal plate 26U. Plates 26L and 26U are preferably bonded to the lower and upper surfaces, respectively, of elastomeric section 24.

Elastomeric section 24 has a plurality of cored out pockets 28 shown in FIG. 1A as being three in number. The actual number of pockets may vary between two and five, depending on the particular needs of the application, three being preferred for this particular usage. The shape of pockets 28 is generally frustoconical, tapering outwardly from top to bottom. It is envisioned that for some applications, pockets 28 may, alternatively, have a cylindrical configuration. The first plurality of pockets 28 receive a second like plurality of helical metal springs 30 which react between the nether surfaces of plates 26L and 26U. A radiused spring seat 31 is provided to prevent the coil spring 30 from initiating a stress crack in elastomeric section 24. The coil springs 30 are designed to fully support the static load of the supported member, in the case of a diesel engine assembly, the thirty ton weight (typical) of that system. Elastomer in section 24 sees no static load which significantly reduces the strain load extending the useful life of the elastomer.

In the application where the vibration isolator 20 is used as part of a system to mount a large diesel engine, by lowering the system's natural frequency (SNF) to a range of between 3 and 5 Hz, the SNF is removed from the idle speed range of the diesel engine to a speed range that the engine moves rapidly through during start up. This essentially eliminates the possibility of sustained system resonance and the destructive build up of forces which can be associated therewith.

Lower and upper plates 26L and 26U have a plurality of extruded cavities 32 which are received in pockets 28 inside springs 30. Cavities 32U are shown being cast integrally with plate 26U while cavities 32L are formed separately from plate 26L and their flanges 36L are received within depressions 34 so flanges 36L are flush with the outer surface of plate 26L. Cavities 32 are shown as being frustoconical but, in certain applications, could be cylindrical. The frustoconical shape is preferred for minimizing part contact during relative movement of associated parts. The protruding ends of cavities 32L and 32U have a layer (38L, 38U) of elastomer bonded thereto to provide cushioned snubbing of compressive movement. The first stage of compressive motion will be damped by the hybrid elastomer-and-metal spring 20, with some energy being dissipated as heat but the majority of the energy being returned to the system through the restorative action of the hybrid spring. Should the jostling or vibration of the engine cause downward movement of upper plate 26U toward lower plate 26L in excess of the design maximum, by way of example, ⅜ inch, elastomer layers 38L and 38U will cushion the snubbing action of the opposed protruding ends of cavities 32L and 32U minimizing the shock or concussion impact of the interface, and limiting total vertical deflection to about ½ inch.

A plurality of tension bolts 40 extend through holes in the end of cavities 32 and secure separable lower cavities 32L to the isolator assembly 20. Double securing nuts 42 are threaded on to bolts to a particular design distance from the bolt head 41. This distance establishes a maximum expansion distance for the isolator assembly 20 and will be associated with a certain level of preload for the coil springs 30. A pair of steel washers 44L and 44U are used to limit movement of the plate 26U in the extension direction. The interior of cavities 32L, 32U are coated with an elastomeric layer 46 to provide cushioning for the snubbing performed by washers 44L and 44U as they limit relative movement in the extension direction. Should the supported member cause plate 26U to move beyond the design distance, for example, ½ inch upwardly, each washer 44L and 44U will contact its respective coating 46 thereby cushioning the snubbing of this relative movement. Further, the longitudinal periphery of lower plate 26L is provided with a pair of reinforcing ribs 45 which resist flexing of the lower plate 26L when the isolator 20 is subjected to upward (extension) loads. In addition, coating 46 prevents clatter from metal-to-metal contact between the bolt head 41 or securing nuts 42 with the interior of cavities 32L and 32U, respectively.

Preload retention nuts 48 are attached to the portions of bolts 40 extending beyond securing nuts 42. Each retention nut 48 is formed with a pilot 49 on its plate-engaging surface to facilitate centering in cavity 32U. When engaged, retention nuts 48 fully preload coil springs 30 to a level between 50% and 100% of the static load the isolator 20 will undergo. Once isolators 20 are in position on and secured to deck 11 (FIG. 3) by bolts (not shown) through holes 50 in lower plate 26L so that cavities 32L cannot be displaced, retention nuts 48 are removed. Spring isolator 20 will expand as far as securing nuts 42 allow, due to the force stored in coil springs 30, from the first level of preload (most preferably, an amount equal to the entire static load) to a second lesser level of preload determined by the position of securing nuts 42 on bolts 40. The supported member 13 will then be positioned on the isolator assemblies 20 and secured thereto by bolting into holes 52 in upper plate 26U. The isolators 20 return to their fully loaded positions. As mentioned earlier, this leaves the elastomeric sections 24 without any static load (fully unloaded).

FIGS. 2 and 3 depict a plurality of pairs of isolators 20 used to suspend a 30 ton diesel engine assembly 13. Such large engines are used in locomotive and marine applications. The longitudinal axes, or force reaction lines, of the isolators will normally be inclined from the vertical by an amount of between 20° and 30° (FIG. 3) to semi-focalize the isolator force reaction lines thereby decoupling the translational and rotational modes of response. Full focalization requires the force reaction lines to be tilted relative to the fore-and-aft and lateral axes, as well, to decouple all three rotational modes from their respective translational modes. In this instance, only semi-focalization is needed and, so the reaction lines are tilted relative to the vertical axis only causing the lateral vibrational motion of the diesel engine 13 to be decoupled from the rolling response about its longitudinal axis. Isolators 20 are positioned on either side of the engine longitudinal centerline in opposing pairs, shown in FIG. 2 as utilizing five pairs of isolators. The number required will vary with the particular engine 13. The upper surface 27 of upper plate 26U has an angle of incline equal to that of the focalization angle such that surface 27 will extend horizontally to engage the lower surface of a mounting wing 15 of engine 13. The tapped holes 52 will be drilled into top plate 26U at a complementary angle so that the attachment bolts (not shown) can be vertically threaded into them securing wing 15 to isolator 20.

In essence, the supported engine 13 floats on the hybrid elastomer-and-metal spring isolator 20 with the elastomer 24 and coil spring 30 free to dynamically react vibrational forces, such that little, if any, vibration is transmitted across the isolator and, should any vibrations be so transmitted as a result of engagement of either the compressive or extension snubbers, such engagement is cushioned. Compression snubbers, in the form of elastomeric cushioning layers 38L and 38U on protruding ends of cavities 32L and 32U respectively, along with extension snubbers in the form of tension bolts 40 cushioned by metal washers 44L and 44U engaging elastomeric layers 46, limit actual total excursion of the engine 13 to ±½ inch, or whatever other level of limited motion is desired. The isolation of assembly 20 is further enhanced by providing a design natural frequency in the range of three to five Hz., a range through which the engine mounted thereupon on briefly transitions during warm up, eliminating the destructive build up of resonant vibrations.

Various changes, alternatives and modifications will be apparent to one of ordinary skill in the art following a reading of the foregoing description. It is intended that all such changes, alternatives and modifications as fall within the scope of the appended claims be considered part of the present invention.

What is claimed is:

1. A hybrid elastomer-and-metal spring vibration isolator of general utility and with specific utility for supporting a large internal combustion engine and isolating its low frequency vibrations, said isolator comprising:
    a) an elastomeric sandwich mount including a large elastomer section positioned between a first lower metal plate and a second upper metal plate, said section having a first plurality of cored out metal-spring receiving pockets;
    b) a second plurality of metal helical coil springs received in said cored out regions, said second plurality being equal to said first plurality;
    c) means to preload said elastomer-and-metal spring isolator by an mount between 50% and 100% of a static load said isolator will experience when supporting said large internal combustion engine.

2. The isolator of claim 1 wherein said elastomeric section is bonded to said first and second plates.

3. The isolator of claim 1 wherein said first and second plates further each comprise a series of extruded cavities which extend into said plurality of cored out pockets through said coil springs for receiving said means to preload said isolator.

4. The isolator of claim 3 wherein said series of cavities on said first and second plates each have a cross section selected from a group substantially consisting of cylindrical and frustoconical.

5. The isolator of claim 3 wherein said series of cavities on said first plate further comprise means to provide cushioned snubbing of movement toward and away from said series of cavities on said second plate after movement of about one-half inch in each direction.

6. The isolator of claim 5 wherein said means to provide cushioned snubbing of movement of said series of cavities on said first plate toward said series of cavities on said second plate comprises a layer of elastomer bonded to an end portion of each series of cavities to cushion snubbing engagements and prevent metal-to-metal contact.

7. The isolator of claim 5 wherein said means to provide cushioned snubbing of movement of said series of cavities on said first plate away from said series of cavities on said second plate comprises a tension bolt with an associated securing nut and two elastomeric washers, one positioned adjacent a head portion of said bolt and another adjacent said securing nut.

8. The isolator of claim 7 wherein said means to preload said isolator comprises a preload retaining nut secured to an end portion of said tension bolt projecting beyond said securing nut, said retaining nut engaging a portion of said first and second plates and the head portion of said tension bolt engaging within said series of cavities on said other plate.

9. The isolator of claim 8 wherein said preload retaining nut further comprises a generally cylindrical centering pilot which is received within one of its respective series of cavities.

10. The isolator of claim 7 further comprising means to muffle raffle of said extension bolt comprising a layer of elastomeric material bonded to an internal surface potion of each of said series of cavities on both said first and second plates.

11. The isolator of claim 1 wherein said hybrid elastomer-and-metal isolator has a natural frequency which in not greater than 5 Hz.

12. The isolator of claim 1 wherein said coil metal springs carry said static load such that said elastomer section sees no static load.

13. A hybrid elastomer-and-metal spring isolator for supporting a large internal combustion engine and isolating its low frequency vibrations, said isolator comprising:
    a) an elastomeric sandwich mount including a large elastomer section positioned between a first lower metal plate and a second upper metal plate, said section having a first plurality of cored out metal-spring receiving regions;
    b) a second plurality of metal helical coil springs received in said cored out regions, said second plurality being equal to said first plurality;
    c) means to provide cushioned snubbing of movement between said first and second plates after a limited amount of movement in each of an axial expansion and an axial compression direction.

14. The isolator of claim 13 wherein said first and second plates further comprise a plurality of cavities protruding inwardly toward said elastomer section of said sandwich mount into each of said cored out regions through the centers of said coil springs.

15. The isolator of claim 14 wherein said series of cavities on said first and second plates each have a cross section selected from a group consisting of cylindrical and frustoconical.

16. The isolator of claim 14 wherein said means to provide cushioned snubbing of movement of said series of cavities on said first plate toward said series of cavities on said second plate comprises a layer of elastomer bonded to an end portion of each series of cavities.

17. The isolator of claim 16 wherein said means to provide cushioned snubbing of movement of said series of cavities on said first plate away from said series of cavities on said second plate comprises an extension bolt with an associated securing nut and two elastomeric washers, one positioned adjacent a head portion of said bolt and another adjacent said securing nut.

18. The isolator of claim 13 further comprising means to preload said elastomer-and-spring isolator by an amount between 50% and 100% of a static load said isolator will experience when supporting said large internal combustion engine.

19. The isolator of claim 18 wherein said means to preload said isolator comprises a preload retaining nut secured to an end portion of said extension bolt projecting beyond said securing nut, said retaining nut engaging a portion of said first and second plates and the head portion of said extension bolt engaging within said series of cavities on said other plate.

20. The isolator of claim 19 wherein said preload retaining nut further comprises a generally cylindrical centering pilot which is received within one of its respective series of protrusions.

21. The isolator of claim 14 further comprising means to muffle raffle of said extension bolt comprising a layer of elastomeric material bonded to an internal surface portion of each of said series of cavities on both said first and second plates.

22. A hybrid elastomer-and-metal spring mounting system for supporting a large internal combustion engine and isolating its low frequency vibrations, said mounting system comprising:
   a plurality of pairs of hybrid mounts, each mount including
   i) an elastomeric sandwich mount including a large section of elastomer positioned between a first lower metal plate and a second upper metal plate, said section having a first plurality of cored out metal-spring receiving regions;
   ii) a second plurality of metal helical coil springs received in said cored out regions, said second plurality being equal to said first plurality;
   whereby each pair of hybrid mounts is oriented to semi-focalize said mounting system thereby decoupling a lateral-vibratory mode of response from a rolling mode of response associated therewith.

23. The mounting system of claim 22 wherein said plurality of pairs of mount includes at least three pairs.

24. A method of mounting a diesel engine comprising the steps of
   i) providing a support platform which does not require complicated mounting pad machining to allow for structural camber;
   ii) providing a plurality of hybrid elastomer-and-metal spring vibration isolators;
   iii) preloading each of said vibration isolators to a first level of preload equal to its share of static load when supporting said diesel engine using a securement means which has a first attachment for producing said first level of preload and a second attachment which produces a second lower level of preload;
   iv) securing each of said plurality of isolators to said skid;
   iv) removing said first attachment of each of said isolators allowing said isolator to expand to said second level of preload;
   v) positioning said diesel engine on said plurality of isolators recompressing said isolator an amount equal to said first level of preload;
   vi) securing said diesel engine to said skid in fixed position on said plurality of isolators.

* * * * *